United States Patent [19]

Ueno et al.

[11] Patent Number: 4,696,548

[45] Date of Patent: Sep. 29, 1987

[54] ANTIGLARE MIRROR FOR AN AUTOMOBILE

[75] Inventors: Yoshiki Ueno, Okazaki; Takasi Taguchi, Anjo; Tadashi Hattori, Okazaki, all of Japan

[73] Assignee: Nippon Soken, Inc., Nishio, Japan

[21] Appl. No.: 742,525

[22] Filed: Jun. 7, 1985

[30] Foreign Application Priority Data

Jun. 8, 1984 [JP] Japan ................................ 59-118878
Aug. 29, 1984 [JP] Japan ............................... 59-181561

[51] Int. Cl.⁴ ............................................... G02F 1/13
[52] U.S. Cl. ................................................... 350/338
[58] Field of Search ............... 350/330, 338, 340, 341, 350/346, 349, 350

[56] References Cited

U.S. PATENT DOCUMENTS

| 4,093,356 | 6/1978 | Bigelow | 350/338 |
| 4,185,894 | 1/1980 | Hilton et al. | 350/338 |
| 4,200,361 | 4/1980 | Malvano et al. | 350/336 |
| 4,257,682 | 3/1981 | Suzuki et al. | 350/349 |
| 4,491,390 | 1/1985 | Tong-Shen | 350/331 R |
| 4,505,547 | 3/1985 | Sekimura | 350/336 X |
| 4,561,726 | 12/1985 | Goodby et al. | 350/350 S X |

FOREIGN PATENT DOCUMENTS

| 2948514 | 6/1981 | Fed. Rep. of Germany | 350/330 |
| 48-35384 | 10/1973 | Japan . | |
| 2029343 | 3/1980 | United Kingdom | 350/331 R |

*Primary Examiner*—Donald A. Griffin
*Attorney, Agent, or Firm*—Cushman, Darby & Cushman

[57] ABSTRACT

An antiglare mirror for an automobile including a metal layer for reflecting incident light and a liquid crystal layer in front of the reflecting surface of the metal layer. The reflected light is colored by forming a transparent dielectric layer on the reflecting surface of the metal layer. The transparent dielectric layer has a higher refractivity than that of the liquid crystal layer. A desired color tone is obtained by selecting the thickness of the transparent dielectric layer.

15 Claims, 13 Drawing Figures

ANTIGLARE MIRROR FOR AN AUTOMOBILE

BACKGROUND OF THE INVENTION

1. Field of the Invention

The present invention relates to an antiglare mirror for an automobile, which mirror may be advantageously used as a rearview mirror or side mirror.

The term "color tone", used throughout the specification, means the perspective evaluation of a color determined by both the lightness and the saturation of the color.

2. Description of the Related Art

Usual mirrors for automobiles consist of a glass substrate on which aluminum is deposited by vacuum evaporation. Such mirrors have a reflectivity as high as 80% to 90% and a relatively flat spectral characteristic. As a result, drivers of automobiles are often temporary blinded by the glare caused when the sun shines behind them in daytime or by the lights of vehicles behind them at night.

In order to eliminate such annoyances, there have been proposed mirrors in which a liquid crystal is used for preventing glare, such as disclosed in Japanese Examined Patent Publication (Kokoku) No. 48-35384. While various types of such mirrors have been proposed, none include the additional feature, enhancing the commercial value of an automobile, by satisfactorily coloring the reflected light.

If an antiglare mirror as mentioned above is colored by a light absorption type color filter or a colorant, the resultant colored light has inferior clearness or brightness. Also there is a problem of discoloration with time. Further, when a colorant is added to a dynamic scattering mode (DSM) liquid crystal, which is used to ensure appropriate reflectivities both when preventing glare and not preventing glare, the coloring effect disappears when glare is being prevented since the DSM liquid crystal becomes cloudy and white at that time.

SUMMARY OF THE INVENTION

An object of the present invention is to provide an antiglare mirror capable of giving a desired color to light reflected from the mirror during both glare prevention operation and non-glare prevention.

Another object of the present invention is to provide an antiglare mirror capable of giving a clear or bright color to the light reflected from the mirror.

The above and other objects, features, and advantages of the present invention are attained by the present invention which provides an antiglare mirror arrangement for an automobile, including a metal layer for reflecting incident light and a liquid crystal layer in front of the reflecting surface of the metal layer, the transparency of the liquid crystal layer being variable by an electric field applied to the liquid crystal layer. The mirror arrangement further includes a transparent dielectric layer on the reflecting surface of the metal layer, the transparent dielectric layer having a higher refractivity than that of the liquid crystal layer and a selected thickness, so that light reflected from the mirror has desired color characteristics.

BRIEF DESCRIPTION OF THE DRAWINGS

The present invention will be described in detail below with reference to the drawings, in which.

DESCRIPTION OF THE PREFERRED EMBODIMENTS

Figure 1:
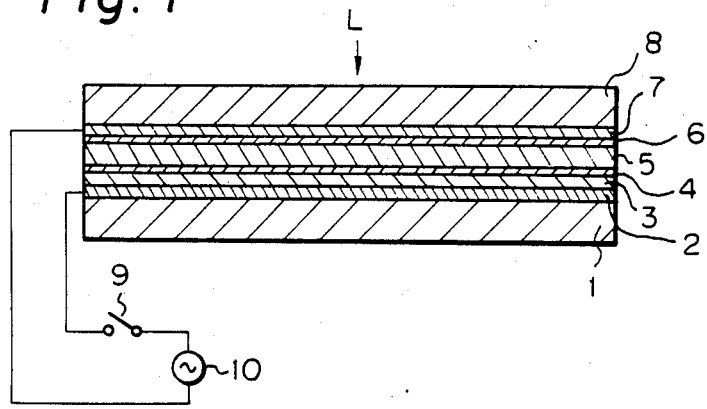
FIG. 1 is a sectional view of an antiglare mirror according to a first embodiment of the present invention.

FIG. 1 illustrates as antiglare reflecting mirror according to the present invention. In FIG. 1, reference numeral 1 denotes a substrate of glass on which a metal layer 2 of a nickel-chrome alloy is deposited by vacuum evaporation, sputtering, etc. The metal layer 2 acts as a light reflecting surface and an electrode. The thickness of the metal layer 2 is sufficient if light does not pass through it (for example, more than about 100 nm). A high refractivity transparent dielectric layer 3 of $TiO_2$ is formed on the metal layer 3 in a selected thickness. The typical refractivity of $TiO_2$ is approximately 2.42. The layer 3 functions to color light by interference between light reflected by the surface of the metal layer 2 and light reflected by the layer 3. On the layer 3, a low refractivity transparent dielectric layer 4 of $SiO_2$ is formed in a reflected thickness. The layer 4 functions to align liquid crystals as well as enchance the coloring of the light reflected by light interference.

Reference numeral 5 denotes a liquid crystal layer, the light transmittance of which may be changed by applying an electric field therethrough, i.e., by change of the molecular alignment of the liquid crystal. In an automobile, it is preferable that the liquid crystal layer 5 be of a type where the transparency is reduced when an electric field is applied. The typical refractivity of the liquid crystal layer 5 is approximately 1.55. In the figure, reference numeral 6 denotes a liquid crystal aligning layer of SiO₂, 7 a transparent electrode of Indium Tin Oxide (ITO) (refractivity: approximately 1.9), 8 a transparent front cover of glass (refractivity: 1.53), 9 a power source, and 10 a switch. From the power source 9 through the switch 10, a required voltage can be supplied between the electrodes, i.e., the metal layer 2 and the transparent electrode 7, to apply an electric field to the liquid crystal layer 5.

The operation of the antiglare reflecting mirror having the construction as in FIG. 1 is as below: First, when no voltage or electric field is applied to the liquid crystal layer 5, incident light in the direction L in FIG. 1 passes through the liquid crystal layer 5, and is reflected at the surface of the metal layer 2. A part of the light is also reflected at the interface between the high and low refractivity dielectric layers 3 and 4. As a result, the interference between the lights reflected from the surface of the metal layer 2 and the interface between the high and low refractivity dielectric layers 3 and 4 occurs and causes coloring of the light leaving the mirror. The color tone of the reflected light is defined by the optical thickness of the high refractivity dielectric later 3. The optical thickness is the product of the refractivity and the thickness of the layer 3 or, if the refractivity is constant, the thickness of the layer 4. These facts are more specifically described below.

Figure 2:
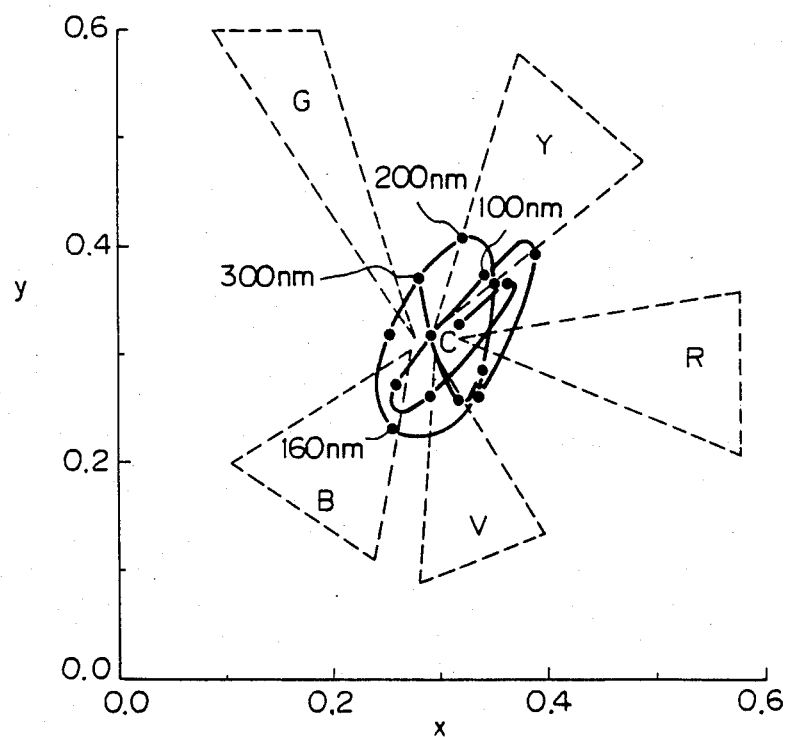
FIG. 2 shows the relationship between the thickness of the transparent dielectric layer and the color tone of the reflected light obtained in the mirror in FIG. 1.

FIG. 2 shows the relationship between the layer thickness of the transparent dielectric layer 3 and the tone of reflected light in the chromaticity coordinate system when standard white light, according to Japanese Industrial Standard (JIS) Z8701, is introduced vertically into the antiglare mirror in FIG. 1, wherein the layer 4 has a constant thickness of 84 nm. In the chromaticity coordinates shown in FIG. 2, the abscissa x designates a red component, and 1−(x+y) designates a blue component. Roughly speaking, in FIG. 2, the areas G, Y, R, V, and B enclosed by the broken lines correspond to areas which provide green, yellow, red, violet, and blue tones, respectively. In the areas located between the above-mentioned areas G, Y, R, V, and B, secondary colors are obtained. FIG. 2 clearly shows that a desired tone can be obtained by selecting an appropriate thickness of the transparent dielectric layer 3. For example, a thickness of the transparent dielectric layer 3 in a range between 55 nm and 85 nm may be preferably used to obtain a desired color tone, preferably a blue tone.

The materials which may be used to make the transparent dielectric layer 3 or 4 are listed with the bulk value of refractivity in Table I.

TABLE I

| Material | Refractivity | Material | Refractivity |
|---|---|---|---|
| LiF | 1.33 | CeF₃ | 1.63 |
| MgF₂ | 1.38 | WO₂ | 1.8 |
| SiO₂ | 1.45 | ZrO₂ | 2.1 |
| SiO | 1.6 | CeO₂ | 2.3 |
| Al₂O₃ | 1.62 | TiO₂ | 2.4 |

The value of the refractivity, actually obtained from the layer varies considerably in accordance with the method and conditions by which the layer is formed. Therefore, it is necessary to measure the actual value of the refractivity of the layer, which is usually smaller than the bulk value shown in Table I. Further, the metal layer 2 can be made of any kind of metal material, including chromium, aluminum, nickel and titanium. The liquid crystal layer 5 can be any type of liquid crystal, the transmittance of which is reduced when an electric field is applied to the liquid crystal layer 5 or when an electric field is released from the liquid crystal layer. For example, guest-host mode liquid crystals and dynamic scattering mode liquid crystals may be used. Typically, the liquid crystal has a refractivity in a range between 1.5 and 1.6.

Figure 3:
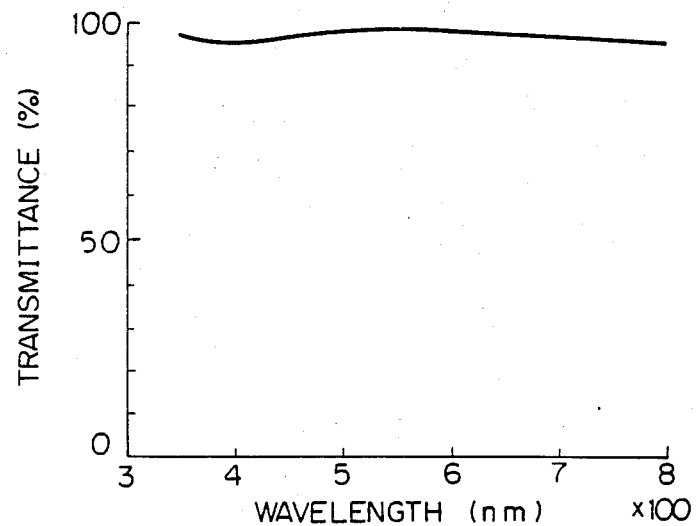
FIG. 3 shows the spectral transmittance of the plurality of layers, i.e., the front cover, the transparent electrode, the liquid crystal aligning layer, and the liquid crystal layer.

In FIG. 1, light passes through the transparent cover 8, the transparent electrode 7, the liquid crystal aligning layer 6, and the liquid crystal layer 5 and light interference may occur in these zones. However, coloring of the reflected light due to the interference in these zones is negligible since the differences of the refractivities of the transparent cover 8 (e.g. 1.53), the transparent electrode 7, (e.g. 1.9) the liquid crystal aligning layer 6, (e.g. 1.45), and the liquid crystal layer 5 (e.g. 1.55) are not so large. For example, when the transparent electrode 7 has a thickness of 75 nm and the liquid crystal aligning layer 6 a thickness of 190 nm, the spectral transmittance shows an approximately flat transmittance characteristic, as shown in FIG. 3. This flat transmittance characteristic does not vary so much even if the thicknesses of those layers are changed.

Figure 4:
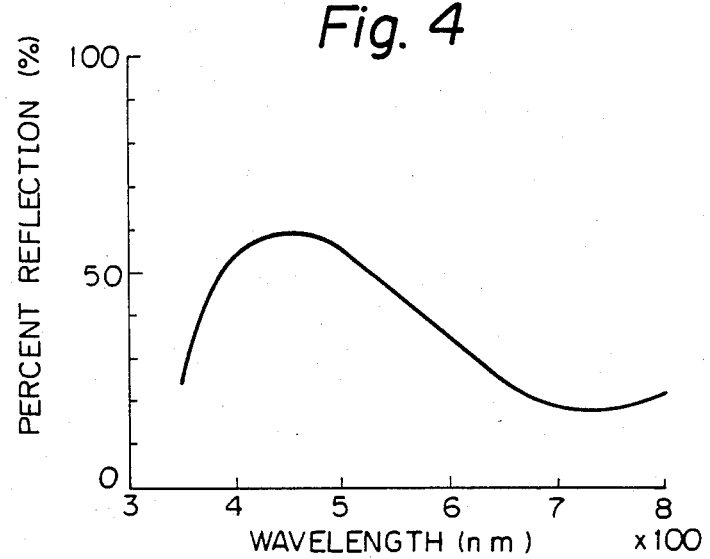
FIG. 4 shows the spectral percent reflection of the antiglare mirror in FIG. 1 during non-glare prevention.

FIG. 4 shows, as an example, the spectral reflection of the antiglare mirror in FIG. 1, during non-glare prevention, wherein the transparent dielectric layer 3 has a thickness of 88 nm. In this spectral reflection, the maximum reflection exists in a blue zone, which means that the mirror gives off blue reflected light when no voltage is applied to the electrodes 2 and 7, and the visual reflectivity is approximately 44% since the maximum human visual sensitivity is approximately 550 nm.

When light is projected to the mirror from an automobile behind the driver at night or the sun shining behind him in the daytime, the driver turns on the switch 10 to apply an electric field to the liquid crystal layer 5. The transmittance of the liquid crystal layer 5 then decreases to eliminate the glare. The reflected light is colored since the light interference still exists due to the transparent dielectric layer 3.

Figure 5:
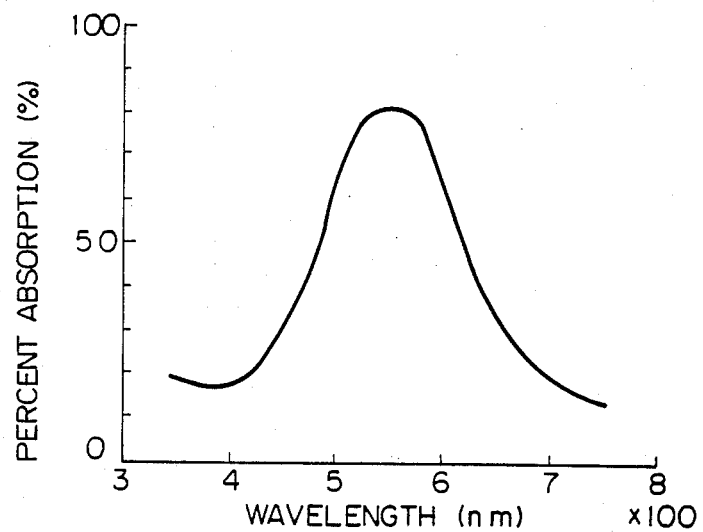
FIG. 5 shows the spectral percent absorption of an anthraquinone system colorant.
Figure 6:
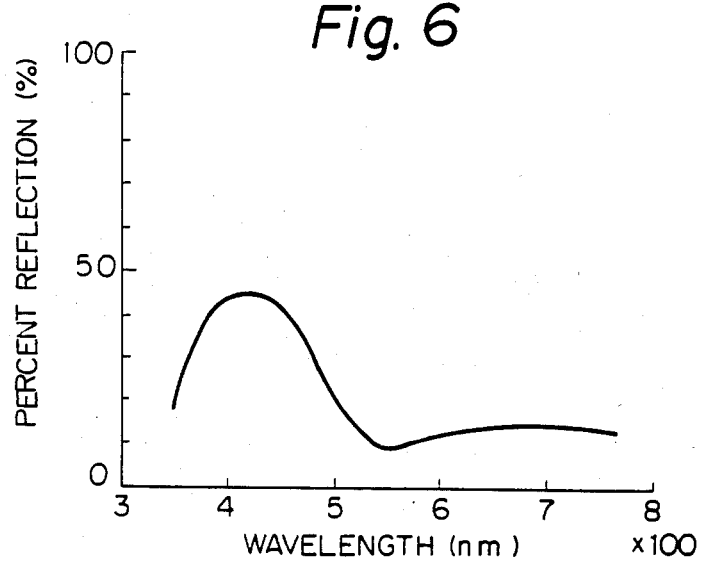
FIG. 6 shows the spectral percent reflection of an antigare mirror comprising a guest-host mode liquid crystal layer containing the anthraquinone system colorant.

If the liquid crystal layer 5 is a guest-host mode liquid crystal layer comprising, for example, a nematic-cholesteric phase transition type liquid crystal as a host liquid crystal and an anthraquinone system colorant as dichroic colorant, (the anthraquinone system colorant has the percent absorption shown in FIG. 5), the antiglare mirror having the spectral reflection in FIG. 4 during non-glare prevention has the spectral reflection as shown in FIG. 6 during prevention of glare, i.e., when an electric field is applied to the liquid crystal layer 5 due to absorption by the dichroic colorant, i.e., anthraquinone system colorant. Compared with FIG. 4, the reflectivity near 555 nm, where the maximum humans visual sensitivity, is reduced and the visual reflectivity is approximately 11%, at which reflectivity the driver is not blinded by the light of an automobile or the sun behind him. The maximum reflection zone is shifted toward a shorter wavelength zone, i.e., a zone corresponding to around violet. This means a change of color tone.

Other types of host liquid crystals and colorants may, of course, be used in the guest-host mode liquid crystal. Proper selection of the thickness of the transparent dielectric layer 3 and the type of the dichroic colorant can result in various combinations of color tones.

Figure 7:
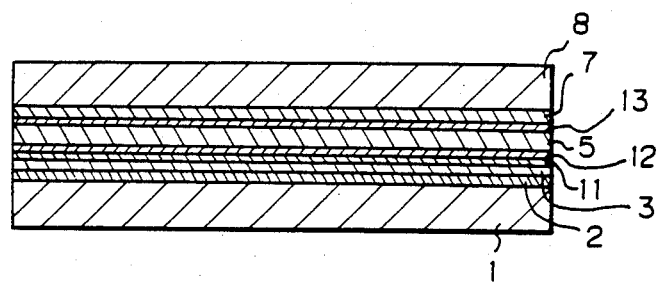
FIG. 7 is a sectional view of an antiglare mirror according to a second embodiment of the present invention.

FIG. 7 shows another embodiment of an antiglare mirror according to the present invention. In this embodiment, an organic film of, e.g., polyimide, is used as the liquid crystal aligning layer. Reference numerals 12 and 13 denote liquid crystal aligning layers of an organic material, such as polyimide. Such layers 12 and 13 have a relatively higher refractivity than the liquid crystal aligning layer 4 used in the mirror in FIG. 1. For example, the typical refractivity of a polyimide film is 1.72. If such organic layers 12 and 13 were used in the mirror having the construction shown in FIG. 1, the difference of the refractivties between the organic layer 12 and the high refractvity transparent dielectric layer 3 would be rather small, decreasing the interference effect and thus making the color of the reflected light lighter. To prevent this, in the mirror in FIG. 7, a low refractivity transparent dielectric layer 11 of, e.g., $MgF_2$, is inserted between the organic layer 12 and the high refractivity dielectric layer 3.

Figure 8:
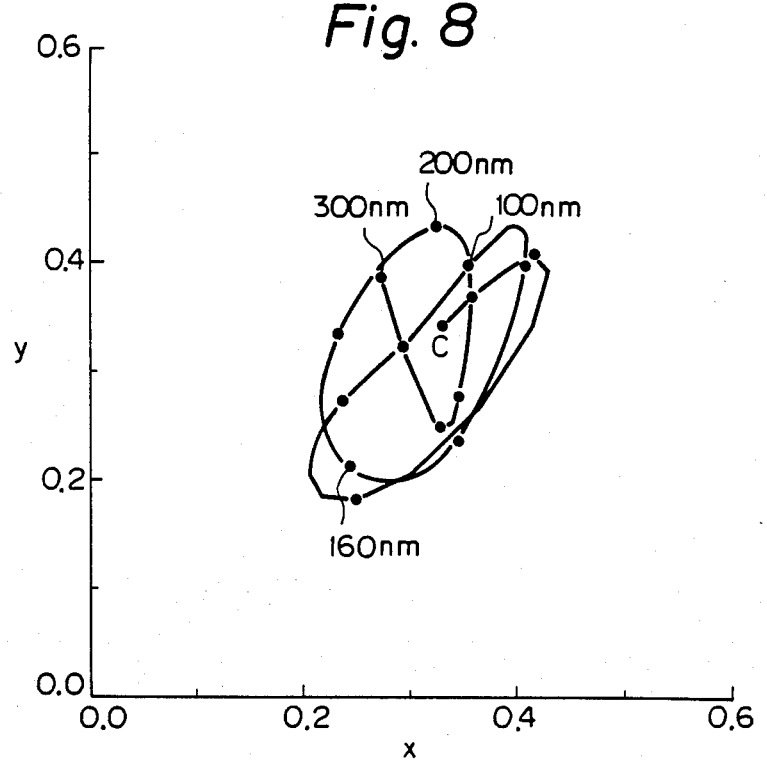
FIG. 8 shows the relationship between the thickness of the transparent dielectric layer and the color tone of the reflected color tone obtained in the mirror in FIG. 7.

FIG. 8 shows the relation between the layer thickness of the high refractivity dielectric layer 3 and the color tone of the reflected light in the mirror in FIG. 7, wherein the organic layers 12 and 13 of polyimide are 90 nm thick and the low refractivity transparent dielectric layer 11 of $MgF_2$ is 100 nm thick. As can be seen in FIG. 8, the path of the hue change is large enough to obtain a desired color tone.

Figure 9:
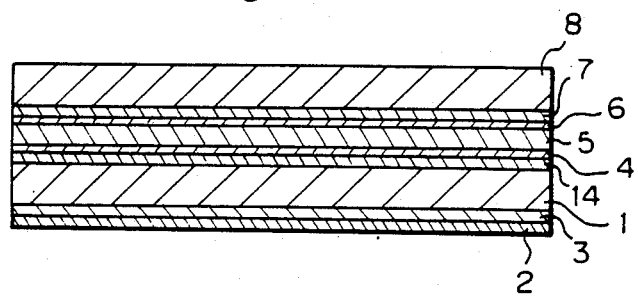
FIG. 9 is a sectional view of an antiglare mirror according to a third embodiment of the present invention.

FIG. 9 shows still another embodiment of an antiglare mirror according to the present invention. In this embodiment, the metal layer 2 reflecting light is formed on the outside surface of the glass substrate 1 opposite to the liquid crystal layer 5. The high refractivity transparent dielectric layer 3 is inserted between the metal layer 2 and the glass substrate 1. A transparent electrode 14 of, e.g., ITO, should be formed on the inside surface of the glass substrate 1 to drive the liquid crystal layer 5 in place of the metal layer 2. The liquid crystal aligning layers 4 and 6 of $SiO_2$ in FIG. 9 may be replaced by an organic material film, etc.

Figure 10:
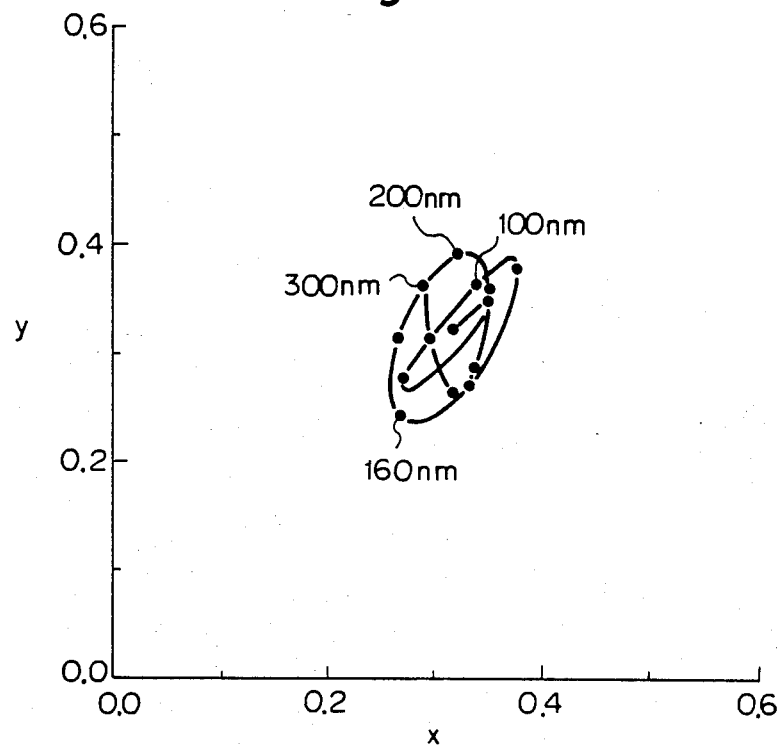
FIG. 10 shows the relationship between the thickness of the transparent dielectric layer and the color tone of the reflected color tone obtained in the mirror in FIG. 9.

FIG. 10 shows the relation between the layer thickness of the high refractivity dielectric layer 3 and the color tone of the reflected light in the mirror in FIG. 9. As can be seen in FIG. 10, any desired hue may be obtained in the mirror in FIG. 9. If a low refractivity transparent dielectric layer is inserted between the high refractivity transparent dielectric layer 3 and the glass substrate 1, the path of the hue change becomes larger, enabling a deeper color tone.

Figure 11:
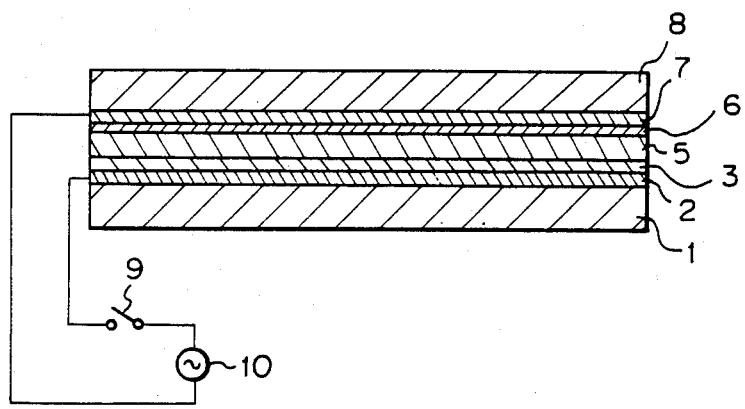
FIG. 11 is a sectional view of an antiglare mirror according to a fourth embodiment of the present invention.

FIG. 11 shows another embodiment of an antiglare mirror according to the present invention. This mirror has a construction similar to that of the mirror in FIG. 1, except that the liquid crystal aligning low refractivity dielectric layer 4 of, e.g., $SiO_2$, is eliminated and the high refractivity transparent dielectric layer 3 is made to function to align the liquid crystals of the liquid cryatal layer 5. This type of antiglare mirror may have any desired hue of reflected light, although the color tone is slightly lighter since the difference between the refractivities of the layers 3 and 5 is smaller than that in the mirror in FIG. 1.

Figure 12:
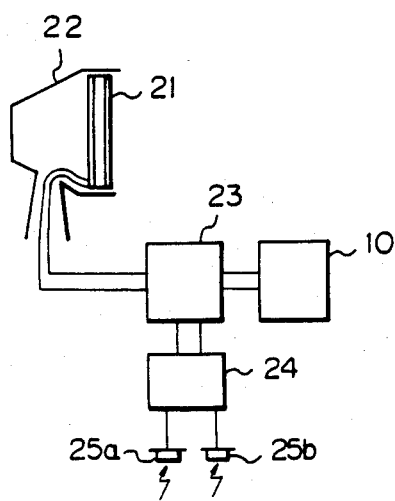
FIG. 12 is a block diagram of an automatic optical switching circuit for an antiglare mirror according to the present invention.

The switch 9 in FIGS. 1, 7, 9, and 11 may be of a manual type, although an automatic type using an optical switch is more convenient. FIG. 12 is a block diagram of an example of such an automatic switch. In FIG. 12, reference numeral 21 denotes the mirror shown in FIGS. 1, 7, 9, and 11 and reference numeral 22 a housing of the mirror 21. The connection between the power source 10 and the mirror 21 is switched by a switch circuit 13, which is operated by the output of a subtractor 24 that compares the outputs of photodetectors 25a and 25b. The reason why the two photodetectors 25a and 25b are used is for detecting glare which is sensed by human eyes. Human eyes do not feel some light sources so much as glare when the surroundings are bright and feel the same light sources very much as glare when the surroundings are dark. One photodetector 25a detects the brightness of the surroundings, and the other photodetector 25b detects the brightness behind the automobile. When the difference of the outputs of the two photodetectors 25a and 25b becomes higher than a predetermined level, that is, the brightness behind the automobile exceeds the brightness of the surroundings to a certain level, glare prevention is effected. Details of a circuit for this are given below with reference to FIG. 13.

Figure 13:
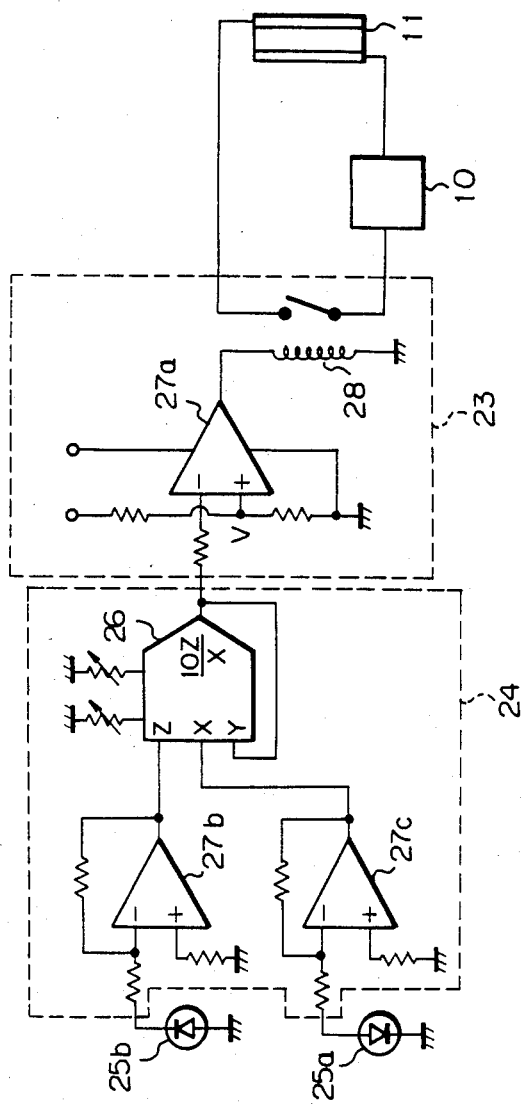
FIG. 13 is a detailed circuit diagram of the automatic optical switching circuit in FIG. 12.

In FIG. 13, reference numeral 26 denotes an analog operating circuit (for example, LX031 produced by CR-BOX), 27a, 27b and 27c operating amplifiers (for example, μA741 available from Teledyne), and 28 a relay. When the output of the subtractor 24 is higher than a predetermined reference voltage V, the output of the operating amplifier 27a acts as a power source which drives the relay 28. As a result, the liquid crystal driving power source 10 supplies voltage to the mirror 11 (ON-state). In contrast, when the output of the subtractor 24 is lower than the reference voltage V, that is, the brightness behind the automobile is as high as the brightness of the surroundings, the output of the operating amplifier 27a becomes approximately zero and the mirror is not supplied with voltage (OFF-state). The two photodetectors 15a and 15b may be placed anywhere so long as one detects light from behind and the other detects the light of the surroundings. Preferably the detector detecting light from behind is placed at a portion of a mirror or a rear window and is directed behind, and the detector detecting light of the surroundings is placed, at a portion of a dashboard and directed sideways.

The antiglare mirror according to the present invention may be used as a fender mirror, a door mirror, a cabin rearview mirror, etc.

We claim:

1. An antiglare mirror arrangement for an automobile, comprising:
    a metal layer for reflecting incident light;
    a liquid crystal layer positioned such that incident light must travel therethrough before striking said metal layer, the transparency of said liquid crystal layer being variable by an electric field applied to said liquid crystal layer for preventing glare;
    a first $TiO_2$ transparent dielectric layer also positioned such that incident light must travel therethrough before striking said metal layer, said first dielectric layer being supported by a glass substrate and having a higher refractivity than that of said liquid crystal layer and a selected thickness, so that light reflecting from said mirror and passing through said first dielectric layer has desired color characteristics.

2. A mirror arrangement according to claim 1, wherein said liquid crystal layer is of the type whose transparency is reduced when an electric field is applied thereto compared to that when an electric field is not applied thereto.

3. A mirror arrangement according to claim 1, further comprising: a second transparent dielectric layer located on the light incident side surface of said first dielectric layer, said second dielectric layer having a refractivity lower than that of said liquid crystal layer.

4. A mirror arrangement according to claim 3, wherein said first dielectric layer is in contact with said liquid crystal layer.

5. A mirror arrangement to claim 1 or 3, further comprising a substrate located on a side of said metal layer opposite to said liquid crystal layer.

6. A mirror arrangement according to claim 1 or 3, further comprising a transparent substrate located between said higher refractivity transparent dielectric layer and said liquid crystal layer.

7. A mirror arrangement according to claim 1 or 3, further comprising a layer in contact with said liquid crystal layer for aligning a liquid crystal of said liquid crystal layer.

8. A mirror arrangement according to claim 1, wherein said second dielectric layer is in contact with said liquid crystal layer.

9. A mirror arrangement according to claim 1, wherein said liquid crystal layer is a Guest-host type liquid crystal layer.

10. A mirror arrangement according to claim 1, wherein said liquid crystal layer is a dynamic scattering type liquid crystal layer.

11. A mirror arrangement according to claim 1, wherein said liquid crystal aligning layer comprises an organic material.

12. A mirror arrangement according to claim 11, wherein said organic material is polyimide.

13. A mirror arrangement according to claim 1, further comprising a manual switch for turning on and off an electric field to said liquid crystal layer.

14. A mirror arrangement according to claim 1, further comprising an optical switch for turning on and off, an electric field to said liquid crystal layer.

15. A mirror arrangement according to claim 1, further comprising:
    means for applying an electric field to said liquid crystal layer,
    means for energizing said electric field applying means,
    means for detecting light from behind the automobile,
    means for detecting light around the automobile other than behind the automobile,
    means for comparing the strengths of the lights detected by said two detecting means, and
    means for turning on and off an electrical connection between said energizing means and said electric field applying means in accordance with the results of said comparison of the strengths of the lights.

* * * * *